US012585886B2

(12) United States Patent
Wang et al.

(10) Patent No.: US 12,585,886 B2
(45) Date of Patent: Mar. 24, 2026

(54) CONVERSATION METHODS, APPARATUS, ELECTRONIC DEVICES, STORAGE MEDIA, AND PRODUCTS

(71) Applicant: Beijing Zitiao Network Technology Co., Ltd., Beijing (CN)

(72) Inventors: Daoyu Wang, Beijing (CN); Hui Sun, Beijing (CN); Ziyang Zheng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/094,630

(22) Filed: Mar. 28, 2025

(65) Prior Publication Data

US 2025/0307565 A1     Oct. 2, 2025

Related U.S. Application Data

(63) Continuation of application No. PCT/CN2024/084795, filed on Mar. 29, 2024.

(51) Int. Cl.
*G06F 40/35*          (2020.01)
(52) U.S. Cl.
CPC .................................... *G06F 40/35* (2020.01)
(58) Field of Classification Search
CPC ...................................................... G06F 40/35
See application file for complete search history.

(56) References Cited

U.S. PATENT DOCUMENTS

| | | | | |
|---|---|---|---|---|
| 7,603,413 B1 * | 10/2009 | Herold | ................ | H04L 12/1813 |
| | | | | 709/204 |
| 10,750,019 B1 * | 8/2020 | Petrovykh | ................ | H04L 51/02 |
| 2008/0080679 A1 * | 4/2008 | Fernandez | .............. | H04L 51/04 |
| | | | | 379/88.17 |
| 2010/0049517 A1 * | 2/2010 | Huang | .................... | G06F 40/35 |
| | | | | 704/E15.005 |
| 2014/0164532 A1 | 6/2014 | Lynch et al. | | |
| 2017/0180276 A1 | 6/2017 | Gershony et al. | | |

(Continued)

FOREIGN PATENT DOCUMENTS

| | | |
|---|---|---|
| CN | 112000781 A | 11/2020 |
| CN | 113569037 A | 10/2021 |

(Continued)

OTHER PUBLICATIONS

International Search Report and Written Opinion for International Application No. PCT/CN2024/084795, mailed on Dec. 23, 2024, 12 pages.

(Continued)

*Primary Examiner* — Eric Yen
(74) *Attorney, Agent, or Firm* — Astute IP Law Group

(57)                    ABSTRACT

This disclosure relates to a conversation method, an apparatus, an electronic device, a storage medium, and a product, which relates to the field of artificial intelligence technology. The conversation method includes: displaying a first conversation between a first user and a second user on a client of the first user, calling one or more robots for the first user based on information of the first conversation; generating auxiliary conversation information of the robots based on the first conversation; and displaying the auxiliary conversation information.

20 Claims, 8 Drawing Sheets

(56) References Cited

U.S. PATENT DOCUMENTS

| | | | | |
|---|---|---|---|---|
| 2017/0295114 A1* | 10/2017 | Goldberg | .............. | H04L 67/306 |
| 2018/0068321 A1* | 3/2018 | Maeda | .................. | B25J 11/0005 |
| 2018/0083894 A1 | 3/2018 | Fung et al. | | |
| 2018/0083901 A1* | 3/2018 | Mcgregor, Jr. | ......... | H04L 51/02 |
| 2018/0089315 A1* | 3/2018 | Seiber | .................. | G06F 16/639 |
| 2018/0181558 A1* | 6/2018 | Emery | .................... | H04L 51/02 |
| 2019/0012390 A1* | 1/2019 | Nishant | .............. | G06F 16/9535 |
| 2019/0089655 A1* | 3/2019 | Uppala | .............. | G06F 16/3329 |
| 2019/0149488 A1* | 5/2019 | Bansal | .................... | G06F 9/453 |
| | | | | 709/206 |
| 2019/0243916 A1* | 8/2019 | Ashoori | ................ | G06F 16/367 |
| 2020/0342032 A1 | 10/2020 | Subramaniam et al. | | |
| 2021/0058346 A1* | 2/2021 | Albrecht | ............. | H04L 12/1813 |
| 2021/0174241 A1* | 6/2021 | Mishra | .................... | G06N 20/00 |
| 2021/0174805 A1* | 6/2021 | Wang | ...................... | G10L 25/63 |
| 2021/0382925 A1 | 12/2021 | Fincun et al. | | |
| 2022/0019747 A1 | 1/2022 | Guo et al. | | |
| 2022/0078139 A1* | 3/2022 | Sreenivasan | ........... | G16H 80/00 |
| 2022/0247699 A1* | 8/2022 | Gupta | .................... | H04L 51/02 |
| 2022/0247700 A1* | 8/2022 | Bhardwaj | .............. | G06N 3/044 |
| 2023/0169966 A1* | 6/2023 | Chong | .................... | G06F 40/35 |
| | | | | 704/231 |
| 2024/0305589 A1* | 9/2024 | Dan | ........................ | H04L 51/02 |

FOREIGN PATENT DOCUMENTS

| | | |
|---|---|---|
| CN | 113728341 A | 11/2021 |
| CN | 115934901 A | 4/2023 |
| EP | 3624136 A1 | 3/2020 |

OTHER PUBLICATIONS

Extended European Search Report received for European Patent Application No. 24866653.9, mailed on Nov. 27, 2025, 9 pages.
Martinez et al., "A Multiparty Chat-Based Dialogue System with Concurrent Conversation Tracking and Memory", Proceedings of the 2nd Conference on Conversational User Interfaces, Jul. 22, 2020, 9 pages.

* cited by examiner

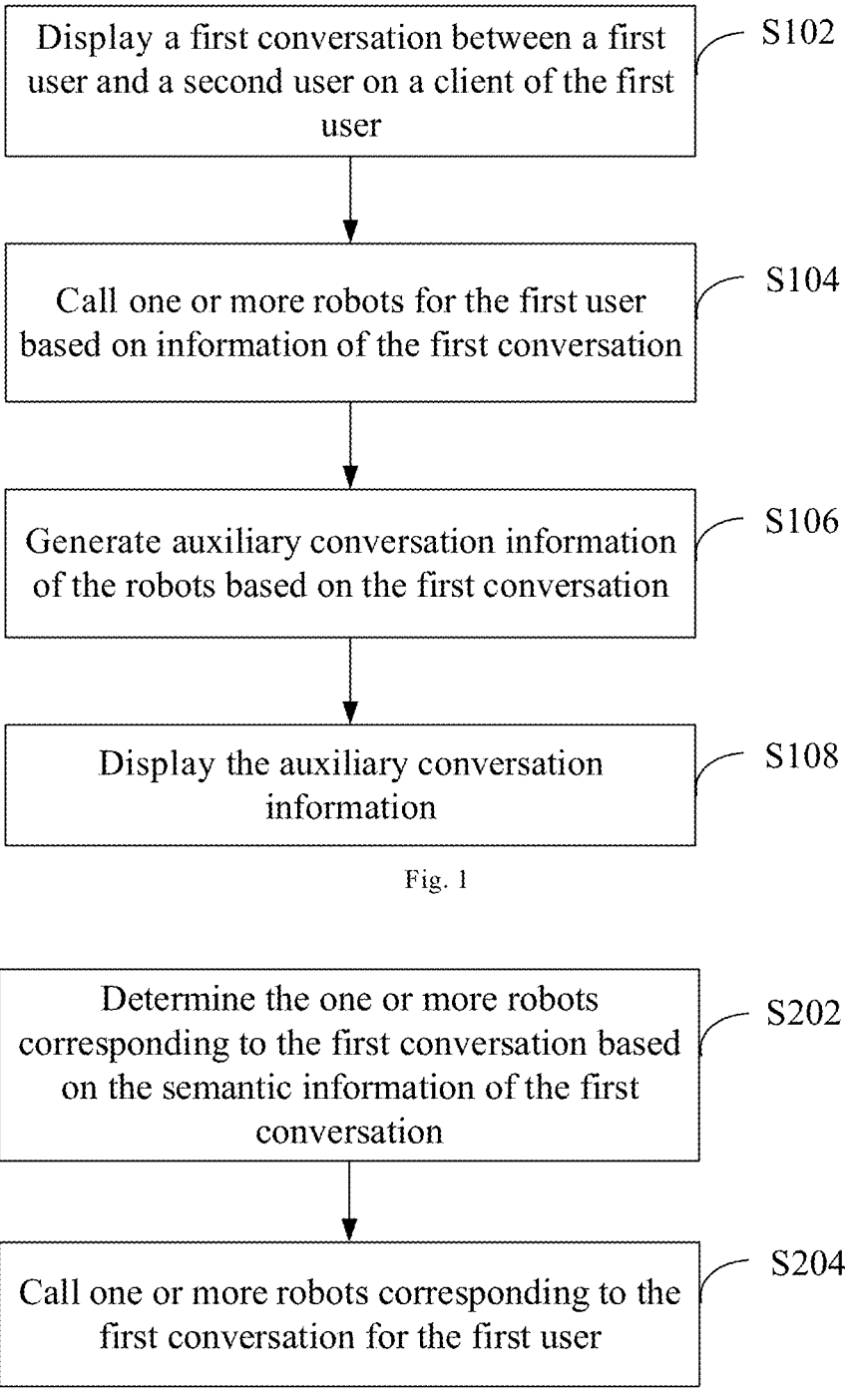

Display a first conversation between a first user and a second user on a client of the first user — S102

Call one or more robots for the first user based on information of the first conversation — S104

Generate auxiliary conversation information of the robots based on the first conversation — S106

Display the auxiliary conversation information — S108

Fig. 1

Determine the one or more robots corresponding to the first conversation based on the semantic information of the first conversation — S202

Call one or more robots corresponding to the first conversation for the first user — S204

CONVERSATION METHODS, APPARATUS, ELECTRONIC DEVICES, STORAGE MEDIA, AND PRODUCTS

CROSS-REFERENCE TO RELATED APPLICATION

The present disclosure is a continuation application, under 35 U.S.C. § 111(a), of International Patent Application No. PCT/CN2024/08479, filed on Mar. 29, 2024, the disclosure of which is hereby incorporated into this disclosure by reference in its entirety.

TECHNICAL FIELD

This disclosure relates to the field of artificial intelligence technology, particularly to a conversation method, an apparatus, an electronic device, a storage medium, and a product.

BACKGROUND

With the development of artificial intelligence (AI) and machine learning technology, intelligent conversation robots can be realized using machine learning models. For example, intelligent conversation robots can serve as AI customer service representatives and virtual friends, receiving inquiries sent from users and feeding back answers to users.

SUMMARY

This summary is provided for a concise introduction of the inventive concept of the present application, which will be described in detail in the Detailed Description below. This summary is not intended to identify critical features or essential features of the claimed technical solution, nor is it intended to be used to limit the scope of the claimed technical solution.

According to some embodiments of this disclosure, there is provided a conversation method, comprising: displaying a first conversation between a first user and a second user on a client of the first user; calling one or more robots for the first user based on information of the first conversation; generating auxiliary conversation information of the robots based on the first conversation; and displaying the auxiliary conversation information.

According to some embodiments of this disclosure, there is provided a conversation apparatus, comprising: a first display module configured for displaying a first conversation between a first user and a second user on a client of the first user; an calling module configured for calling one or more robots for the first user based on information of the first conversation; a generation module configured for generating auxiliary conversation information of the robots based on the first conversation; and a second display module configured for displaying the auxiliary conversation information.

According to some embodiments of this disclosure, there is provided an electronic device, comprising: at least one memory; and at least one processor coupled to the memory, wherein the processor is configured to execute instructions stored in the memory to perform the conversation method provided by any embodiment of the present disclosure.

According to some embodiments of this disclosure, there is provided a non-transitory computer-readable storage medium stored thereon a computer program that, when executed by a processor, performs the conversation method provided by any embodiment of the present disclosure.

According to some embodiments of this disclosure, there is provided a non-transitory computer program product that, when running on a computer, causes the computer to implement conversation method provided by any embodiment of the present disclosure.

According to some embodiments of the present disclosure, there is provided a computer program, comprising: instructions that, when executed by a processor, cause the processor to perform the conversation method provided by any embodiment of the present disclosure.

Other features, aspects and advantages of the present disclosure will become apparent from the following detailed description of exemplary embodiments of the present disclosure with reference to the accompanying drawings.

BRIEF DESCRIPTION OF THE DRAWINGS

Below, preferred embodiments of this disclosure will be described with reference to the drawings. The accompanying drawings described herein are intended to provide a further understanding of the present disclosure, and together with the specific description of the drawings below, are included in and constitute a part of the present specification for illustration of the present disclosure. It should be understood that the drawings described below merely involve some embodiments of the present disclosure, and are not limitations of the present disclosure. In the drawings:

FIG. 1 shows a flowchart of a conversation method according to some embodiments of the present disclosure;

FIG. 2 shows a robot calling method according to some embodiments of the present disclosure;

Figure 3:
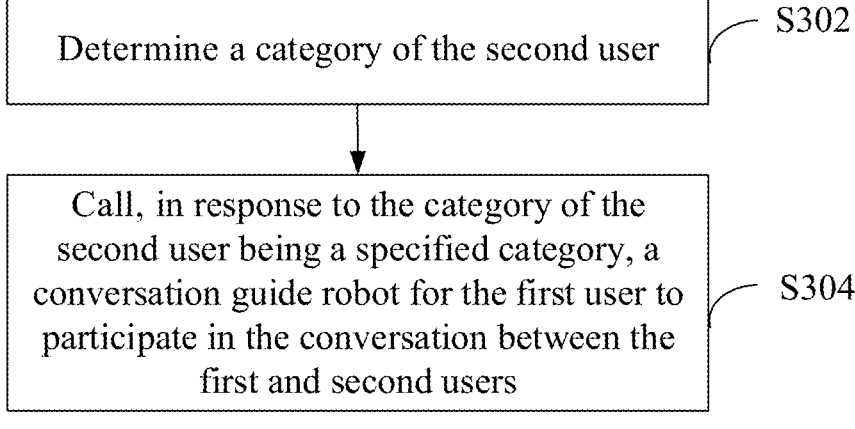
FIG. 3 shows a robot calling method according to other embodiments of the present disclosure.

It should be understood that, for ease of description, the dimensions of the various parts shown in the drawings are not drawn to actual proportions. Throughout the drawings, the same or similar reference signs indicate the same or similar elements. Therefore, once an item is defined in a drawing, there is no need for further discussion in other accompanying drawings.

DETAILED DESCRIPTION

Below, a clear and complete description will be given for the technical solution of embodiments of the present disclosure with reference to the figures of the embodiments. Obviously, merely some embodiments of the present disclosure, rather than all embodiments thereof, are given herein. The description of the embodiments is merely illustrative, and in no way serves as any limitation on the present disclosure and its application or use. It should be understood that the present disclosure can be implemented in various forms and should not be construed as limited to the embodiments set forth herein.

It should be understood that the various steps described in the methods of the embodiments of the present disclosure may be executed in a different order, and/or executed in parallel. In addition, the methods may include additional steps and/or some of the illustrated steps may be omitted. The scope of this disclosure is not limited in this regard. Unless specifically stated otherwise, relative arrangement and values of components and steps, numerical expressions and values set forth in these embodiments are to be construed as merely illustrative, not limiting the scope of the present disclosure.

The term "comprising" and its variations used in this disclosure refer to an open-ended term that comprises at least the following elements/features, but does not exclude other elements/features, i.e. "comprising but not limited to". In addition, the term "including" and its variations used in this disclosure refer to an open-ended term that includes at least the following elements/features, but does not exclude other elements/features, i.e., "including but not limited to". Therefore, the terms "comprising" and "including" are synonymous. The term "based on" means "based at least in part on".

"An embodiment", "some embodiments" or "embodiments" used throughout the specification mean that specific features, structures or characteristics described in connection with the embodiments are included in at least one embodiment of the present invention. For example, the term "an embodiment" means "at least one embodiment"; the term "another embodiment" means "at least one additional embodiment"; the term "some embodiments" means "at least some embodiments". In addition, occurrences of the phrases "in an embodiment," "in some embodiments," or "in embodiments" throughout this specification do not necessarily refer to the same embodiment, but may refer to the same embodiment.

It should be noted that the concepts of "first" and "second" mentioned in the present disclosure are only used to distinguish different devices, modules or units, and are not used to limit the order of functions performed by these devices, modules or units, or interdependence therebetween. Unless otherwise specified, terms such as "first" and "second" are not intended to imply that objects described in this way must be in any particular order in time, space, rank, or otherwise.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

The following will provide a detailed explanation of the embodiments disclosed herein with reference to the accompanying drawings, but the present disclosure is not limited to these specific embodiments. The following specific embodiments can be combined with each other, and the same or similar concepts or processes may not be repeated in some embodiments. In addition, in one or more embodiments, specific features, structures or characteristics may be combined in any suitable manner, as will be apparent to those skilled in the art from this disclosure.

It should be understood that this disclosure does not limit the way of acquiring the images to be applied/processed. In one embodiment of this disclosure, an image can be acquired from a storage device, such as an internal memory or an external storage device. In another embodiment of this disclosure, a photography component can be activated to capture an image. It should be noted that the acquired image may be a captured image or a frame from a captured video, which is not particularly limited in this embodiment.

In the context of this disclosure, the image may refer to any of a variety of images, such as a color image, a grayscale image, etc. It should be noted that in the context of this description, the type of images is not specifically limited. In addition, the image can be any suitable image, such as a raw image acquired by a camera device, or an image that has undergone specific processing, such as preliminary filtering, de-aliasing, color adjustment, contrast adjustment, normalization, and so on, on a raw image. It should be noted that preprocessing can also include other types of operations known in the field, which will not be described in detail here.

In the application scenario of intelligent conversation robots in related technologies, robots are mainly provided by application developers to act as a party in conversation with users, i.e., a responder to messages sent from users. The robots can respond to messages sent from users based on user input and their own knowledge bases. That is, the application scenario is a scenario in which a user engages in a conversation with a robot alone. Robots cannot be applied to personalized social networking scenarios for individual users.

An embodiment of the present disclosure provides a conversation between a first user and a second user, wherein a robot may be called for the first user based on the information of the conversation to assist in the conversation between the first user and the second user.

FIG. 1 shows a flowchart of a conversation method according to some embodiments of the present disclosure. As shown in FIG. 1, the conversation method of this embodiment includes steps S102 to S108.

In step S102, a first conversation between a first user and a second user is displayed on a client of the first user.

The client of the first user refers to a client logged on to the first user's account or a client used by the first user. This client can provide online chat function between the first user and other users. For example, it can be an application client based on social networking, instant messaging, or other types of clients that include network chat modules.

The second user is a user who engages in online chat with the first user. The second user can be a real user, such as a contact of the first user or other users in the application. Of course, the second user can also be a virtual user, such as an agent (intelligent agent) created by the first user or other users, or an agent provided by an application.

The first conversation between the first user and the second user may include messages sent from both of the first user and the second user, or may include only messages sent from the second user due to the first user's delay in viewing and responding to messages, or may include only messages sent from the first user. In addition, it can further include messages sent from other users. That is, the embodiments of this disclosure is applicable to a scenario where a first user is chatting with a single user as well as a group chat scenario where a first user is chatting with multiple users.

In step S104, one or more robots are called for the first user based on information of the first conversation.

The information of the first conversation includes at least one of content information or attribute information of the first conversation. The content information can be understood as the content body of the conversation, which includes text, voice, images, videos, emojis, links, and other content sent from the users. The attribute information includes, for example, attribute information about the content of the conversation, such as sending time, text length, etc., as well as attribute information about the senders, such as information of the sender, relationships between senders, etc.

A robot can generate corresponding content based on conversation messages sent from other subjects in the conversation scene, such as the first user, the second user, and other users or robots participating in the conversation, and can be implemented in software, hardware, or a combination of software and hardware. Robots can also be referred to as digital humans or virtual agents of machine learning models. Robots can be implemented based on machine learning models, such as Large Language Models (LLM) or Foundation Models. Machine learning models can be generative models, which are used to output target content based on input information. The input information of a generative model includes the processing basis of the generative model during the generation process, such as what information is referenced to conduct the generation process, the requirements of the output target content, and so on. Generative models include models that generate based on text or images, and their output can be text, images or a combination of text and images. Of course, the input or output of generative models can also be data from other modalities, such as audio, video, or a combination of multiple types of data. Generative models may be single-modality models, such as the models that generate text based on text (referred to as "text to text-generation model"), or models that generate images based on images (referred to as "image to image generation model"); or generative models may also be cross-modality models, the input and output of which belong to different modalities, such as models that generate images based on texts (referred to as "text to image generation models"); or the input and output of generative models may be data from multiple modalities.

When calling a robot, one or more robots corresponding to the information of the first conversation can be selected from one or more candidate robots. The called robot can be created by the first user, created by other users, or provided by the application. Candidate robots can include multiple types of robots or multi-purpose robots, and each robot can generate responses based on its pre-configured setup information, response strategy, etc.

The robot can directly participate in the conversation between the first user and the second user. The robot can also generate reference information for the first user's conversation. For example, the robot can display the generated content only to the first user, who can copy or edit the content and send it to the second user.

Robots can be divided into several types based on their types, application scenarios, and uses. For example, the robots may include a virtual avatar robot that serves as a virtual avatar or digital avatar of the first user and can mimic some of the habits and characteristics of the first user, thereby participating in conversations on behalf of the first user in certain scenarios. As another example, robots can be divided into tool robots, knowledge robots, and emotional robots according to their applicable scenarios. Tool robots can help users use other functions of the application, such as booking flights, booking hotels, and online shopping. Knowledge robots have knowledge bases that can provide users with factual information. Emotional robots can ana-lyze the user's emotions in a conversation, provide emotional support to the user in a conversation, or activate the chat atmosphere based on the relationship between the first user and other users.

After determining the called robot(s), the user's consent can be requested before executing the invocation process. Alternatively, a robot can be automatically called based on its configured logic and strategy, after prior and uniform confirmation by the user.

In step S106, auxiliary conversation information of the robots is generated based on the first conversation.

The auxiliary conversation information refers to information used to assist the first user in the conversation with the second user, making the conversation between the first user and the second user smoother. The auxiliary conversation information can be a message sent from the robot itself during the conversation, or reference information provided to the first user. Regardless of the form it takes, it can include at least one of reference information associated with the first conversation, a summary of the first conversation, or a response to the second user.

The robot can generate the auxiliary conversation information using a machine learning model it relies on. For example, some or all of the content of the first conversation can be fed into the robot's machine learning model. The input information may also include some indicative information, such as requirements for the content, format, and style of the generated information. After an output is obtained from the model, the output information with or without processing can be used as the auxiliary conversation information.

In step S108, the auxiliary conversation information is displayed.

The auxiliary conversation information is displayed in the client of the first user. For example, it can be displayed in a conversation interface between the first user and the second user. The auxiliary conversation information can be visible to both the first and second users, or it can be visible only to the first user. In some embodiments, when the auxiliary conversation information is displayed, the robot's identification (such as avatar, name, etc.) may also be displayed in association to indicate the source of the auxiliary conversation information.

In a case where a robot is involved in the conversation, the robot can be displayed differently from real users so that the second user knows that the current conversation is with a robot. For example, an indicator such as "AI" and "Robot" can be added, or the message sent from a robot can be labeled in a different style.

In the above embodiment, during the conversation between the first user and the second user, the conversation information is automatically used to call a robot to assist the first user in the conversation, thereby enriching the conversation content and enhancing the content and enjoyment of the conversation between the first user and the second user.

This disclosure provides two exemplary ways for a robot to assist the first user in a conversation. Of course, those skilled in the art may employ other methods as needed, which will not described in detail herein.

In an exemplary way, a robot participates in a conversation between a first user and a second user. That is, the robot can act as a subject in the conversation to send messages to the first and second users. A group chat is then formed among the first user, the second user, and the robot, which can include even more subjects depending on the situation. In this embodiment, the auxiliary conversation information is the information sent from the robot during the process of participating in the conversation between the first user and the second user. That is, after generating the auxiliary conversation information, the robot can send it as its own message, making the auxiliary conversation information also the content of the conversation among the first user, the second user, and the robot. Thus, it is possible to directly enrich the content of the conversation.

In an exemplary way, instead of directly participating in the conversation between the first user and the second user, the robot provides reference information to the first user. This reference information can be visible to both the first and second users, or it can be visible only to the first user. In this embodiment, the auxiliary conversation information is information provided to the first user for reference. In this way, the robot can be used as a behind-the-scenes tour for the first user, without appearing in the conversation, while assisting the first user and reducing the impact on the tone of the conversation between the first and second users.

The above two methods can be manually selected by the user or automatically selected based on the conversation scenario. In some embodiments, a conversation scenario between the first user and the second user is determined based on the information of the first conversation; in response to the conversation scenario being a first type, the one or more robots for participating in the conversation between the first user and the second user for the first user are called; and in response to the conversation scenario being a second type, the one or more robots for providing reference information for the first user are called.

The conversation scenario is used to help determine whether the robot needs to directly participate in the conversation between the first user and the second user. In the first type of scenarios, the robot needs to participate directly in the conversation, for example, when the first user and the second user have a close relationship, when the relationship between the first user and the second user is not intimate and the second user is of little importance to the first user (such as chatting with a stranger), or when the topic of conversation between the first user and the second user is aimless, and so on. In the second type of scenarios, the robot may not need to directly participate in the conversation, for example, when the relationship between the first and second users is not intimate and the second user is of high importance to the first user, or when the chat content between the first and second users involves professional fields. When determining the conversation scenario, multiple dimensions involved in the information of the first conversation can be fed into a machine learning model or matched with preset conditions for each scenario to obtain a conversation scenario classification result.

After the description of the application scenario of the robot provided in this embodiment, a robot calling method provided in some embodiment of the present disclosure will be described below.

The embodiment shown in FIG. 2 illustrates the robot invocation method from a semantic perspective. FIG. 2 shows a robot calling method according to some embodiments of the present disclosure. In this embodiment, the information of the first conversation includes semantic information. As shown in FIG. 2, the invocation method of this embodiment includes steps S202 to S204.

In step S202, the one or more robots corresponding to the first conversation are determined based on the semantic information of the first conversation.

The semantic information reflects main content involved in the first conversation, which can include one or more of a summary, key content, or a topic of the conversation. In some embodiments, a semantic analysis model can be used to process all or part of the conversation messages in the first conversation to obtain the semantic information.

Some exemplary ways for determining target conversation messages in the first conversation to determine the semantic information of the first conversation based on target conversation messages will be provided below. Of course, those skilled in the art may use other methods to determine the semantic information as needed.

In some embodiments, a specified amount of last generated conversation message(s) in the first conversation are used as the target conversation to determine the semantic information of the first conversation based on the target conversation. The specified amount of conversation message (s) can be conversation message(s) of a specified length (i.e., a specified number of words), a specified number, or a specified number of rounds (one or more consecutive messages sent from the same user belong to the same round). Thus, by performing semantic analysis on the last generated messages with a certain amount of information, the semantic information in the current first conversation can be obtained.

In some embodiments, conversation message(s) last generated within a specified time period in the first conversation are used as the target conversation to determine the semantic information of the first conversation based on the target conversation. This approach also involves semantic analysis of the last generated messages, but more specifically, it determines the content that can be referenced from a temporal perspective and, based on this content, determines the semantic information in the current first conversation.

In some embodiments, conversation messages belonging to a same topic in the first conversation are used as the target conversation to determine the semantic information of the first conversation based on the target conversation. This approach classifies messages by topic, allowing semantic information to be extracted based on the primary focus of the conversation. If the first conversation contains multiple topics, the conversation messages under the topic with the largest amount of information can be determined to be the target conversation. Users may occasionally change topics due to the unconstrained character of conversations, but quickly return to the original topic. Therefore, this approach can extract the most important information from the first conversation.

The semantic information can be embodied as a summary of the first conversation, key information in the first conversation, or both of them. It is possible to determine the type of information to use based on the topic covered by the information in the first conversation.

If the first conversation has a relatively simple and clear topic, summary information can be generated to reflect the semantics of the first conversation. In some embodiments, topic(s) involved in one or more rounds of conversation in the first conversation are determined; and in response to a number of topic(s) involved in the one or more rounds of conversation not exceeding a specified value, summary information of the first conversation is determined as the semantic information of the first conversation. Since the semantics expressed in a conversation round are usually continuous, this embodiment takes the rounds of conversation as the smallest units to count the topics involved in one or more rounds of conversation. The one or more rounds of conversation can be the last conversation content in the first conversation. Of course, statistics can be performed in other units as needed, such as words, message numbers, etc., which will not be described in detail here. If the number of topics involved in the one or more rounds of conversation is not greater than a specified value, it indicates that the topics involved in these rounds of conversation are relatively clear. Therefore, generating summary information can reflect the conversation semantics more easily, accurately, and comprehensively.

In some embodiments, key information is extracted from the first conversation as the semantic information of the first conversation. The key information may be, for example, keywords and key sentences. The key information can be determined by matching against a predefined table of key information or by analyzing core words and sentences in the conversation. The key information can be extracted from the first conversation as the semantic information when the number of topics involved in the one or more rounds of conversation exceeds a specified value. That is, in a case where the topics involved in the conversation are relatively scattered and unclear, key information is extracted to reflect the key content under each scattered topic. Of course, in the case where the number of topics involved in one or more rounds of conversation is not greater than the specified value, key information can also be extracted as the semantic information.

Based on the semantic information, a robot that matches the first conversation can be determined. In some embodiments, the semantic information of the first conversation is matched with the attributes of one or more candidate robots, and one or more robots corresponding to the first conversation are determined based on the matching result. The robot attributes may be type, setting information, and description information. When matching the semantic information with the robot attributes, a matching degree can be determined by calculating the similarity between the semantic information and the attributes. For example, a specified number of robots with the highest matching degree or robots with a matching degree higher than a specified threshold can be determined as matched robots. Therefore, the called robots can more accurately respond to the content currently being discussed by the first and second users.

In some embodiments, it is possible to determine whether to select robots corresponding to the semantic information of the first conversation based on the number of topics involved in the first conversation. For example, in response to the number of topics involved in the semantic information not being greater than a specified value, the semantic information of the first conversation is matched with the attributes of one or more candidate robots, and one or more robots corresponding to the first conversation are determined based on the matching result; in response to the number of topics involved in the semantic information being greater than the specified value, or if the semantic information involved in the first conversation is unclear, a conversation guide robot is determined as the robot corresponding to the first conversation. That is, if there are few topics in the first conversation (such as not greater than a specified value), it indicates that the topic of the first conversation is clear, and robots that match the semantics of the first conversation can be called based on the semantic information of the first conversation. If the first conversation contains many topics (such as greater than a specified value) or the semantics are unclear, for example, no topic can be extracted, this indicates that the current conversation between the first and second users does not have a clear topic. A conversation guide robot can be used to introduce a topic to liven up the chat atmosphere between the two users.

The conversation guide robot is used to initiate further communication between the first and second users with content containing new topics. For example, association information of the semantic information is generated based on the semantic information of the first conversation and second conversation, and information of the first user and the second user; and a message sent from the conversation guide robot is generated based on the association information. The association information of the semantic information can be obtained by expanding the semantic information, or by determining a topic associated with the semantic information and obtaining the association information based on the associated topic. When generating the association information, it is possible to refer to the information of both the first and second users, such as their attributes or the relationship therebetween. For example, if the first user and the second user have an aimless chat, the first conversation includes "Did you eat?", "Yes", "Oh", "Hmm", and some meaningless expressions. At this point, a conversation guide robot can be invoked to participate in the conversation. For example, as the topic of dining above, the conversation guide robot can send a message such as "Who did you eat with, a female colleague?" to liven up the chat atmosphere. Alternatively, the conversation guide robot can provide the first user with several pieces of reference conversation auxiliary information that are visible only to the first user, such as "Ask her if she has eaten", "Next time we can go eat XXX together", etc., so that the first user can continue the conversation with the second user based on this prompt.

In step S204, one or more robots corresponding to the first conversation are called for the first user.

In the above embodiment, one or more robots are called based on the semantic information of the first conversation, so that the called conversation robot can match the content discussed by the first user and the second user, thereby improving the effect of the robot's conversation assistance to the first user. Thus, it further enhances the richness and enjoyment of the conversation between the first user and the second user.

In some embodiments, it is also possible to further determine whether the first conversation corresponds to a service intent based on semantic information. For example, the application provides some service functions, such as booking flights, booking hotels, online shopping, and so on. If the topic or key information of the first conversation can match these service functions, it is considered that there is a service intention in the first conversation. In response to the first conversation that corresponds to a service intent, auxiliary conversation information is generated that includes at least one of a product card or a service subscription card. Therefore, the first user or both the first and second users can quickly access service functions during the conversation, which can help users improve the efficiency of service function usage.

FIG. 3 shows an embodiment to describe the robot calling method from the perspective of the category of the second user. FIG. 3 shows a robot calling method according to other embodiments of the present disclosure. In this embodiment, the information of the first conversation includes the category of the second user. As shown in FIG. 3, the invocation method of this embodiment includes steps S302 to S304.

In step 302, a category of the second user is determined. The category of the second user can be determined based on whether he/she is a contact of the first user, or based on a category tag or group that is set for the second user by the first user. Other determination methods can also be adopted by those skilled in the art, which will not be described in detail here.

In step S304, in response to the category of the second user being a specified category, a conversation guide robot is called for the first user to participate in the conversation between the first and second users.

The specified category can be set by users. For a user of the specified category, the first user would like to invite a conversation guide robot to join the chat during the conversation to liven up the atmosphere. For example, if the first user is chatting with a close friend, the first user hopes that a conversation guide robot can join in and liven up the atmosphere so that the conversation can continue. In this case, a preset condition for the appearance of a conversation guide robot can be that the first user is having a conversation with a second user of a specified category, so that the robot automatically appears and participates in the conversation when the first user and the second user of the specified category are having a conversation. The auxiliary conversation information of the conversation guide robot is a message sent from the conversation guide robot during the process of participating in the conversation. The method of generating the auxiliary conversation information may refer to the previous embodiments, which will not be repeated here.

In the above embodiment, a robot is invoked based on the type of the second user so that the robot invocation can be automatically determined for a designated chat object of the first user, thereby enhancing the enjoyment of the chat between the first user and the second user.

Figure 4:
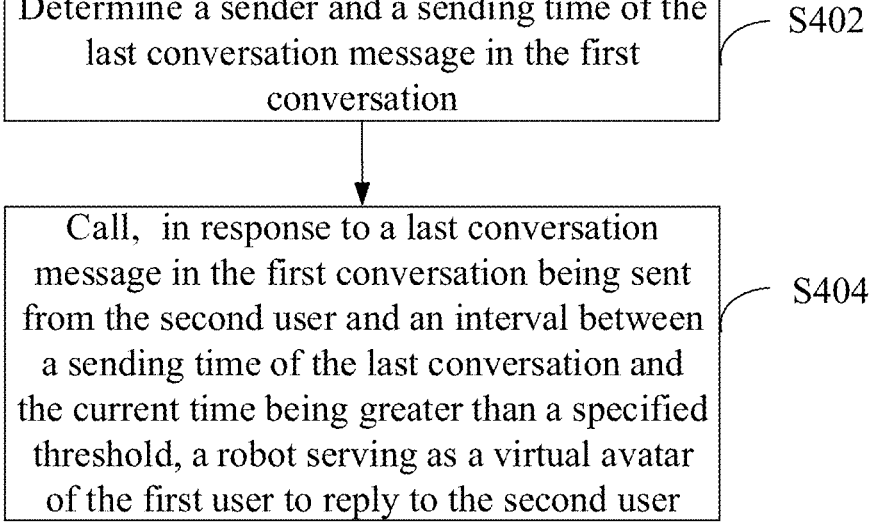
FIG. 4 shows a robot calling method according to further embodiments of the present disclosure.

FIG. 4 shows an embodiment to describe the robot calling method from the perspective of conversation state. FIG. 4 shows a robot calling method according to further embodiments of the present disclosure. In this embodiment, the information of the first conversation includes a time of conversion. As shown in FIG. 4, the invocation method of this embodiment includes steps S402 to S404.

In step S402, a sender and a sending time of the last conversation message in the first conversation are determined.

In step S404, in response to a last conversation message in the first conversation being sent from the second user and an interval between a sending time of the last conversation and the current time being greater than a specified threshold, a robot serving as a virtual avatar of the first user is called to reply to the second user.

If the sender of the last conversation message is the first user, it means that the first user has replied to the message sent from the second user. If the sender of the last conversation message is the second user, it means that the first user has not replied to the message sent from the second user, and if the last message was sent a while ago, it means that the first user may not have time to view the message or may not want to reply to the second user. In this case, a robot that can replace the first user can be called to respond to the second user, allowing the second user to receive a timely response and improving the smoothness of communication between the first and second users.

The virtual avatar of the first user can be a robot created by the first user to replace the first user in conversations with other users. The attributes of the virtual avatar can be configured by the first user, and some system default attributes can be used when creating the avatar.

In some embodiments, a profile photo of the virtual avatar robot can be generated based on an image specified by the first user. The user can choose from local images or upload cloud images, or galleries provided by the application. After the user specifies an image, it can be processed to obtain an image with added effects as the profile photo of the robot. For example, a real person photo uploaded by the user can be processed into a comic image. In this image processing, an image to image generation model can be used for processing. For example, the user-specified image and a processing instruction (such as "Generate a cartoon image for me" or "Make your eyes bigger") can be input into the model; or style or filter templates provided by the application can be used.

In some embodiments, the voice of the virtual avatar robot is generated based on a voice specified by the first user. The user can choose from local voices, uploaded cloud voices, or voice libraries provided by the application. The user-specified voice can then be subjected to voice transformation or mixed with multiple timbres to create richer sound effects as needed.

By using the above method of creating a virtual avatar robot, a robot can be created or edited based on user-specified attributes. In this way, the degree of matching between the virtual avatar robot and the first user's conversation intention can be improved, allowing the robot to better assist in the conversation.

After the robot to be called is determined, the user can also be prompted for confirmation before the robot is called. In some embodiments, a first calling control for a robot corresponding to the first conversation is displayed; and in response to the first user performing a trigger operation on the first calling control, generation of the auxiliary conversation information is triggered. Therefore, the robot is called after the first user confirms the robot recommended based on the conversation using the first calling control. After calling the robot via the calling control, the robot can provide at least one of reference information associated with the first conversation, a summary of the first conversation, or a response to the second user as the auxiliary conversation information. In this way, the robot can respond to the user's confirmation as a conversational assistant, and provide various forms of responses.

Figure 5A:
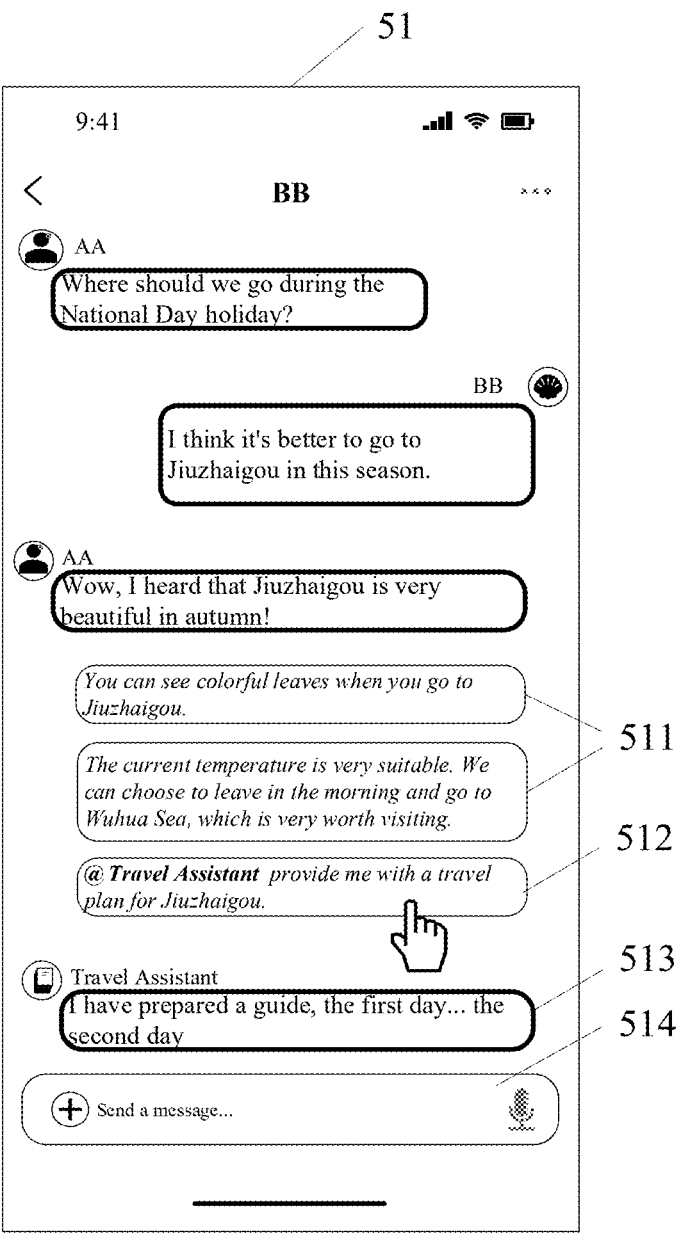
FIGS. 5A, 5B, and 5C show schematic diagrams of conversation interfaces according to some embodiments of the present disclosure.
Figure 5B:
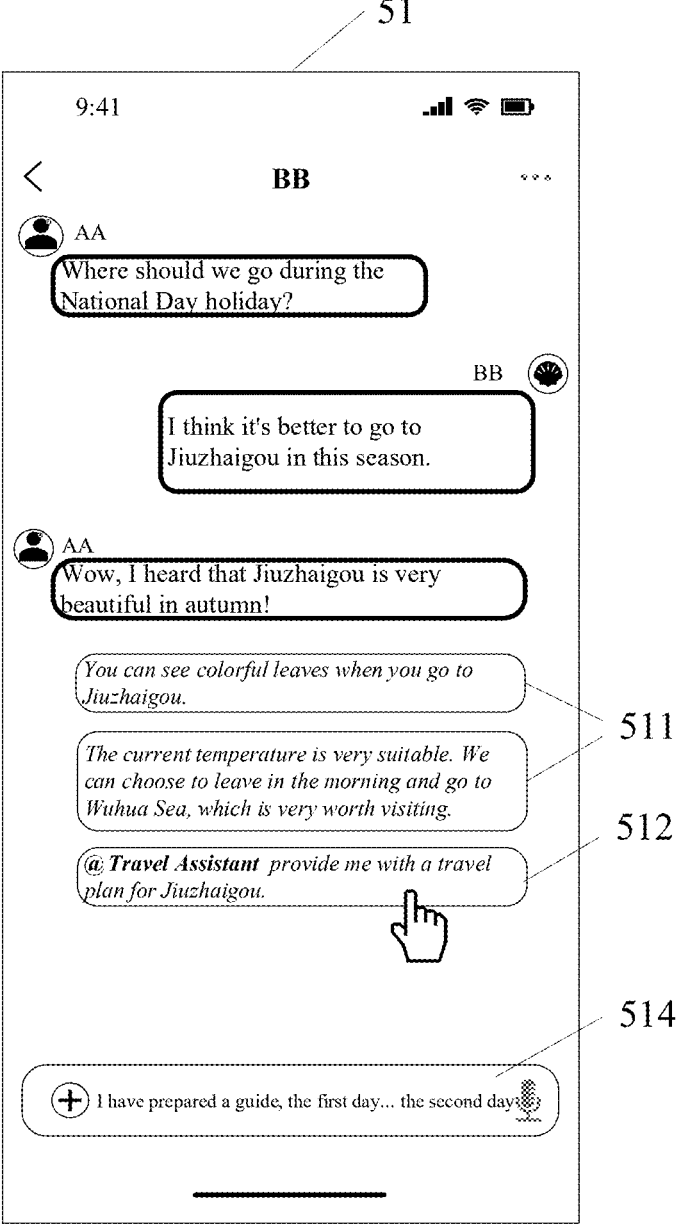
Figure 5C:
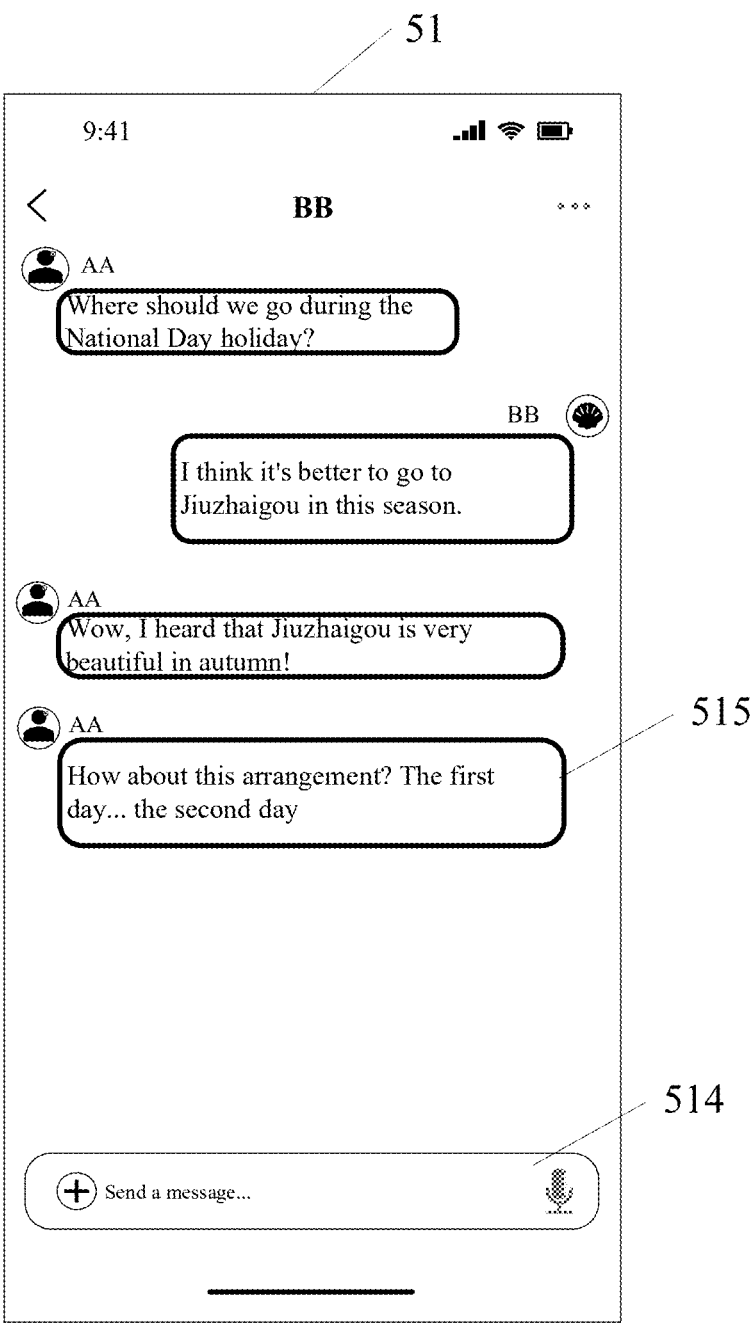

FIGS. 5A, 5B, and 5C show schematic diagrams of conversation interfaces according to some embodiments of the present disclosure. As shown in FIG. 5A, a conversation interface 51 of this embodiment is an interface for a conversation between a first user AA and a second user BB. In this conversation, the two users are talking about the topic "Trip to Jiuzhaigou".

The application can generate an auto-reply message in response to detecting this topic, such as the content shown in 511, so that user AA can quickly respond by sending the content immediately after triggering a control provided for the auto-reply message. The control 511 can also include an identification of a robot that provides the auxiliary conversation information. The control 511 is not visible to user BB.

In the conversation interface 51, a first calling control 512 can also be displayed. Based on the conversation between two users, it can be determined that the corresponding robot is a "Travel Assistant". The first calling control 512 may carry a travel assistant identification, such as a name or a profile photo, to allow the user to confirm whether to call the robot. The first calling control 512 is also not visible to user BB.

In some embodiments, the calling control includes instruction information to the robot generated according to the semantic information of the first conversation. In response to a trigger operation performed by the first user on the first calling control, the generation of the auxiliary conversation information is triggered based on the instruction information and the first conversation. For example, in the conversation interface 51, in addition to the name "Travel Assistant", the first calling control 512 further includes instruction information "Provide me with a Jiuzhaigou travel plan". Thus, when the user triggers the first calling control 512, the instruction information can be sent to the travel assistant robot, so that the robot can generate an answer based on the conversation content and the instruction information.

As described in the preceding embodiments, the robot can participate in the conversation or just provide reference information that is visible only to the first user. In some embodiments, the auxiliary conversation information sent from the robot participating in the conversation between the first user and the second user is displayed on the conversation interfaces of the first user and the second user. For example, a travel assistant can send messages as a participant in the conversation, as shown in the message control 513 in FIG. 5A. As another example, the travel assistant can also display the generated information on the client of the first user. In some embodiments, the generated content can be directly filled into the first user's message input control, such as the input box 514 shown in FIG. 5B, and then the first user can directly send the message or edit the message before sending.

After the first conversation, the first user can continue to send messages based on the auxiliary conversation information provided by the robot. In some embodiments, a second conversation sent from the first user is displayed, wherein the second conversation is determined based on the auxiliary conversation information that is not visible to the second user. For example, based on FIG. 5B, the user can edit the content automatically filled into the input box 514 by the robot, such as changing "I have prepared a guide, the first day . . . the second day . . . " as shown in FIG. 5B to "How about this arrangement, the first day . . . the second day . . . " and send it. As a result, a message sent from user AA appears in the conversation interface 51, as shown in the message control 515 of FIG. 5C.

The above embodiments provide a method for automatically recommending a robot to the user or a method for automatically and directly calling a robot. In some embodiments, the user may also manually control whether to use a robot to assist the conversation.

Figure 6:
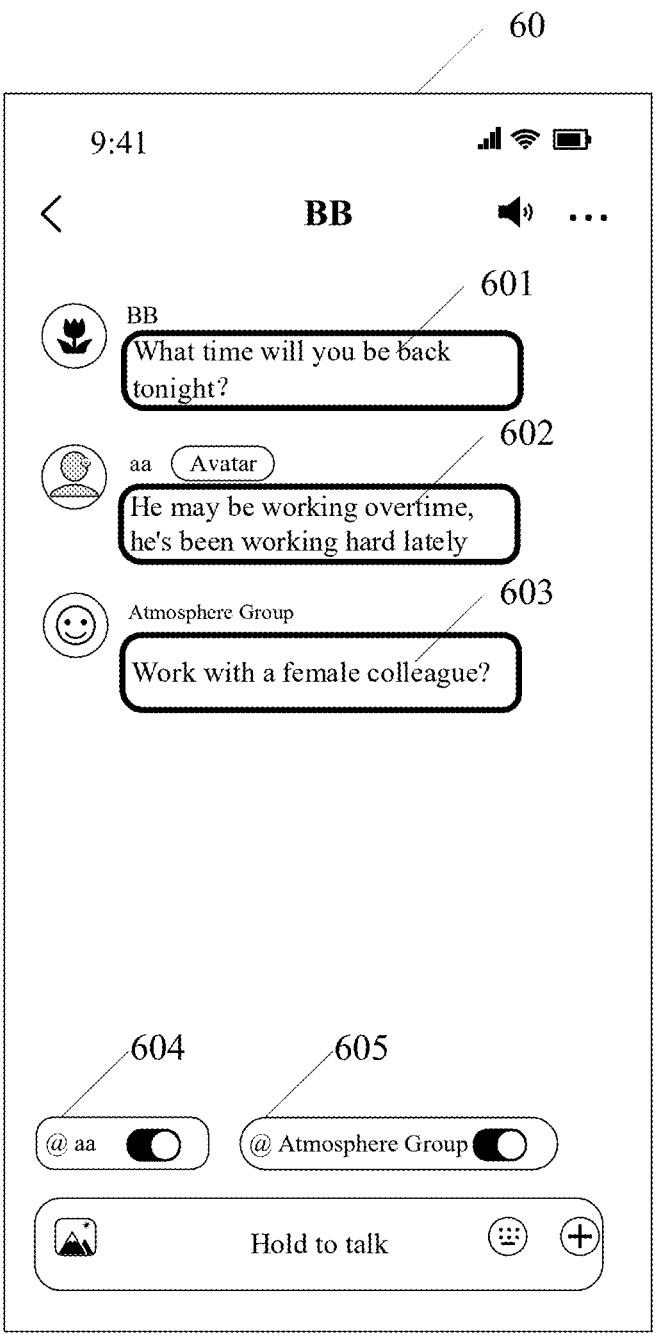
FIG. 6 shows a schematic diagram of a conversation interface according to some embodiments of the present disclosure.

FIG. 6 shows a schematic diagram of a conversation interface according to some embodiments of the present disclosure. As shown in FIG. 6, a conversation interface 60 of this embodiment is a conversation interface between the first user AA and the second user BB, wherein the user BB sends a message 601 "What time will you be back tonight.".

Since user AA does not respond for a long time, in some embodiments, a virtual avatar robot aa of user AA may be automatically called based on the current conversation status. The robot aa then sends a message 602 in the conversation saying "He may be working overtime, he's been working hard lately". In some embodiments, it is also possible to automatically called an "Atmosphere Group" conversation guide robot in response to the fact that user BB and user AA are in a loving relationship. The "Atmosphere Group" robot then sends a message 603 "Work with a female colleague?" to make fun of the conversation and liven up the atmosphere.

Some or all of the robots shown in FIG. 6 can also be manually called by the user. In some embodiments, in response to the first user's operation to invoke to a robot, the robot determined based on the information of the first conversation or the robot specified by the operation is displayed. It is possible to display the robot in the conversation (i.e. to join the robot in the conversation) or to display the robot for the first user (i.e. to instruct the robot to provide reference information). For example, an calling control 604 for robot aa and an calling control 605 for the Atmosphere Group can be provided in the interface 60. The first user can activate or deactivate the robots by triggering controls 604 and 605. The activated robots will participate in the conversation, while the deactivated robot will not. Therefore, in addition to automatic robot calling, users can also manually call the robots as needed, thereby improving their degree of freedom in using the robots. When a robot is activated, the robot can decide whether to send a message and what content to send based on the content output by each subject in the current conversation.

In some embodiments, the robot may output a round of messages every time it responds to the first user's calling operation. For example, a second calling control corresponding to a candidate robot is displayed. In response to a trigger operation on the second calling control, the candidate robot's response to the first conversation is displayed. For example, second calling controls for one or more candidate robots can be provided in the conversation interface. For a candidate robot, each time the first user clicks on its second calling control, the robot joins the conversation and sends a message. After that, the robot stops sending messages until the user triggers its second calling control again. This allows the robot to participate in the conversation in response to the user's needs and to have more control over the robot's level of participation.

The conversation method provided in embodiments of the present disclosure has been introduced above. Below, a relevant apparatus provided by an embodiment of the present disclosure will be described in conjunction with the accompanying drawings.

Figure 7:
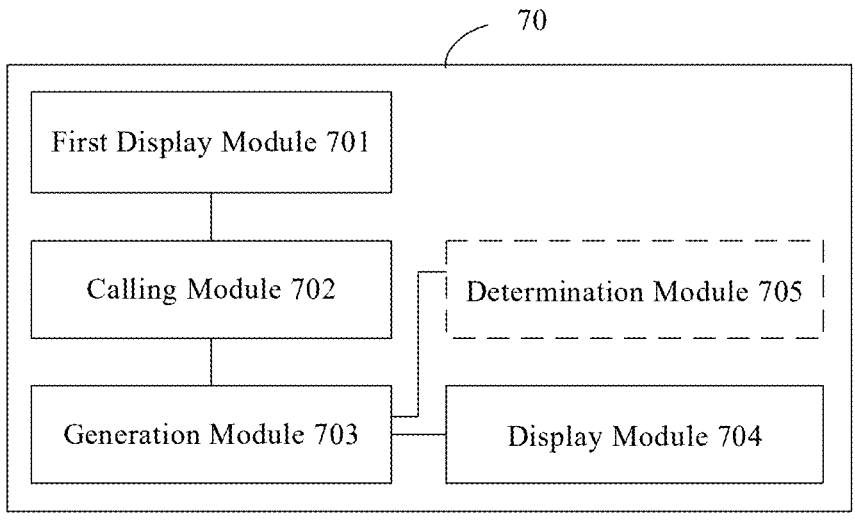
FIG. 7 shows a schematic structural diagram of a conversation apparatus according to some embodiments of the present disclosure.

FIG. 7 shows a schematic structural diagram of a conversation apparatus according to some embodiments of the present disclosure. As shown in FIG. 7, the conversation apparatus 70 of this embodiment comprises: a first display module 701 configured for displaying a first conversation between a first user and a second user on a client of the first user; an calling module 702 configured for calling one or more robots for the first user based on information of the first conversation; a generation module 703 configured for generating auxiliary conversation information of the robots based on the first conversation; and a second display module 704 configured for displaying the auxiliary conversation information.

In some embodiments, the auxiliary conversation information is information sent from the robot during a process of participating in the conversation between the first user and the second user; or the auxiliary conversation information is information provided to the first user for reference.

In some embodiments, the calling module 702 is further configured for: determining a conversation scenario between the first user and the second user based on the information of the first conversation; calling, in response to the conversation scenario being a first type, the one or more robots for participating in the conversation between the first user and the second user for the first user; and calling, in response to the conversation scenario being a second type, the one or more robots for providing reference information for the first user.

In some embodiments, the information of the first conversation comprises semantic information and the calling module 702 is further configured for: determining the one or more robots corresponding to the first conversation based on the semantic information of the first conversation; and calling the one or more robots corresponding to the first conversation for the first user.

In some embodiments, the conversation apparatus 70 further comprises a determination module 705.

In some embodiments, the determination module 705 is configured for: taking a specified amount of last generated conversation message(s) in the first conversation, or conversation message(s) last generated within a specified time period in the first conversation, or conversation messages belonging to a same topic in the first conversation as a target conversation; and determining the semantic information of the first conversation based on the target conversation.

In some embodiments, the determination module 705 is configured for: determining topic(s) involved in one or more rounds of conversation in the first conversation; and determining, in response to a number of topic(s) involved in the one or more rounds of conversation not exceeding a specified value, summary information of the first conversation as the semantic information of the first conversation.

In some embodiments, the determination module 705 is configured for: extracting key information from the first conversation as the semantic information of the first conversation.

In some embodiments, the calling module 702 is further configured for: determining, in response to a number of topic(s) involved in the semantic information being greater than a specified value, or the semantic information involved in the first conversation is unclear, a conversation guide robot as a robot corresponding to the first conversation; and matching, in response to the number of topic(s) involved in the semantic information not being greater than the specified value, the semantic information of the first conversation with attribute(s) of one or more candidate robots; and determining the one or more robots corresponding to the first conversation based on a matching result.

In some embodiments, the information of the first conversation comprises a category of the second user and the calling module 702 is further configured for: calling, in response to the category of the second user being a specified category, a conversation guide robot for participating in the conversation between the first user and second user for the first user.

In some embodiments, the auxiliary conversation information is a message sent from the conversation guide robot during a process of participating in the conversation, and the generation module 703 is further configured for: generating association information of the semantic information based on the semantic information of the first conversation and second conversation, and information of the first user and the second user; and generating a message sent from the conversation guide robot based on the association information.

In some embodiments, the information of the first conversation comprises a sending time of conversion, and the calling module 702 is further configured for: calling, in response to a last conversation message in the first conversation being sent from the second user and an interval between a sending time of the last conversation and the current time being greater than a specified threshold, a robot serving as a virtual avatar of the first user to reply to the second user.

In some embodiments, a profile photo of the virtual avatar robot is generated based on an image specified by the first user, and a voice of the virtual avatar robot is generated based on a voice specified by the first user.

In some embodiments, the calling module 702 is further configured for: displaying a first calling control for a robot corresponding to the first conversation; and triggering, in response to the first user performing a trigger operation on the first calling control, generation of the auxiliary conversation information.

In some embodiments, the calling control comprises instruction information to the robot generated according to semantic information of the first conversation, and the calling module 702 is further configured for: triggering, in response to a trigger operation of the first user on the first calling control, generation of the auxiliary conversation information based on the instruction information and the first conversation.

In some embodiments, the auxiliary conversation information comprises at least one of reference information associated with the first conversation, a summary of the first conversation, or a response to the second user.

In some embodiments, the display module 704 is further configured for: displaying a second conversation sent from the first user, wherein the second conversation is determined based on the auxiliary conversation information which is not visible to the second user.

In some embodiments, the display module 704 is further configured for: displaying, on the conversation interface of the first user and the second user, the auxiliary conversation information sent from a robot participating in the conversation between the first user and the second user.

In some embodiments, the generation module 703 is further configured for: generating, in response to the first conversation corresponding to a service intent, the auxiliary conversation information comprising at least one of a product card or a service subscription card.

In some embodiments, the display module 704 is further configured for: displaying, in response to a calling operation of the first user on a robot, a robot determined based on the information of the first conversation or a robot specified by the operation.

In some embodiments, the display module 704 is further configured for: displaying a second calling control corresponding to a candidate robot; and displaying, in response to a trigger operation on the second calling control, a response of the candidate robot to the first conversation.

It should be noted that the above units are only logical modules divided according to their specific functions and are not intended to limit the specific ways in which they are implemented. For example, they may be implemented in software, hardware or a combination of software and hardware. In practical implementation, the above units may be implemented as independent physical entities, or they can also be implemented by a single entity (such as a processor (CPU or DSP), integrated circuit, etc.). In addition, the above units are indicated by dashed lines in the accompanying drawings, indicating that these units may not actually exist and that the operations/functions they perform may be performed by a processing circuit per se.

In addition, although not shown, the device may also include a memory that can store various information generated by the device or various units in the device during operation, programs and data used for operation, data to be sent from a communication unit, and so on. The memory may be volatile memory and/or non-volatile memory. For example, the memory may include, but is not limited to, random access memory (RAM), dynamic random access memory (DRAM), static random access memory (SRAM), read-only memory (ROM), and flash memory. Of course, the memory may also be located outside of the device. Optionally, although not shown, the device may also include a communication unit that may be used to communicate with other apparatus. In an example, the communication unit may be implemented in any suitable manner known in the art, including communication components such as an antenna array and/or radio frequency links, various types of interfaces, communication units, and so on, which will not be described in detail herein. In addition, the device may also include other components not shown, such as a RF link, a baseband processing unit, a network interface, a processor, a controller, etc., which will not be described in detail herein.

Figure 8:
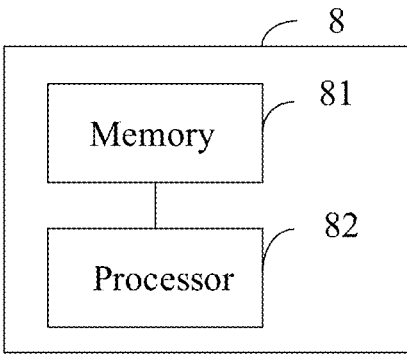
FIG. 8 shows a schematic structural diagram of an electronic device according to some embodiments of the present disclosure.

Some embodiments of the present disclosure further provide an electronic device. FIG. 8 shows a structure diagram of an electronic device according to some embodiments of the present disclosure. For example, in some embodiments, the electronic device 8 may be any type of electronic device, such as, but not limited to, a mobile terminal such as a mobile phone, a laptop, a digital broadcast receiver, a PDA (personal digital assistant), a PAD (tablet computer), a PMP (portable multimedia player), a vehicle terminal (such as vehicle navigation terminal), or a fixed terminal such as a digital TV, a desktop computer, etc. For example, the electronic device 8 may include a display panel for displaying data and/or execution results utilized in the scheme of the present disclosure. For example, the display panel can have various shapes. For example, it can be a rectangular panel, an elliptical panel, or a polygonal panel. Furthermore, the display can be not only flat, but curved or even spherical.

As shown in FIG. 8, the electronic device 8 of this embodiment comprises: a memory 81 and a processor 82 coupled to the memory 81. It should be noted that the components of the electronic device 8 shown in FIG. 8 are illustrative and not limiting. Depending on the actual application requirements, the electronic device 8 may include other components. The processor 82 can control other components in the electronic device 8 to perform desired functions.

In some embodiments, the memory 81 is used to store one or more computer-readable instructions. The processor 82 is used to execute these computer-readable instructions that, when executed by the processor 82, perform the method according to any of the above embodiments. The specific implementation of each step of the method and related explanations can be found in the above embodiments, and will not be repeated here.

For example, the processor 82 and the memory 81 can directly or indirectly communicate with each other. For example, the processor 82 and the memory 81 can communicate over a network. The network can be a wireless network, a wired network, and/or any combination of wireless and wired networks. The processor 82 and the memory 81 may also communicate with each other over a system bus, and this disclosure is not limited thereto.

For example, the processor 82 may be embodied as various suitable processors, processing devices, etc., such as a central processing unit (CPU), a graphics processing unit (GPU), a network processor (NP), etc; It can also be a digital signal processor (DSP), an application specific integrated circuit (ASIC), a field programmable gate array (FPGA), or other programmable logic devices, discrete gates or transistor logic devices, or discrete hardware components. The central processing unit (CPU) may be based on the X86 or ARM architecture. For example, the memory 81 may include any combination of various forms of computer-readable storage media, such as volatile memory and/or non-volatile memory. The memory 81 may include a system memory, which stores an operating system, application programs, a boot loader, a database, and other programs. Various applications and data can also be stored in the storage media.

Figure 9:
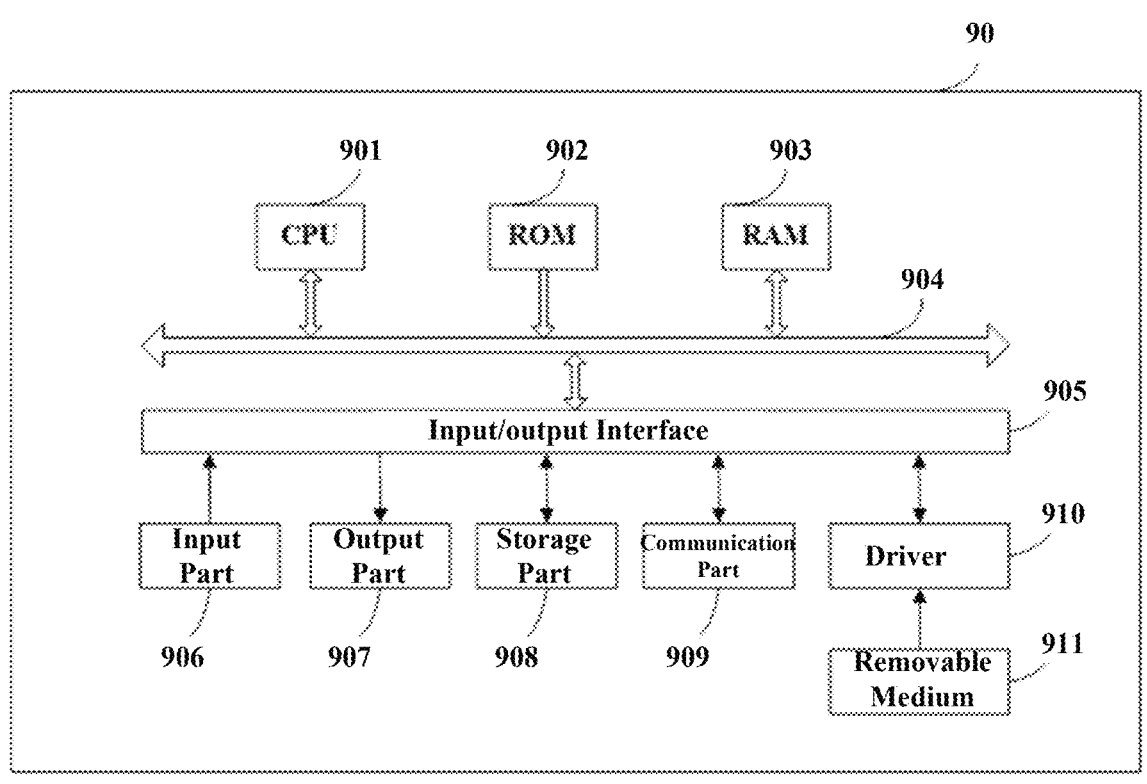
FIG. 9 shows a schematic structural diagram of a computer system according to some embodiments of the present disclosure.

In addition, according to some embodiments of the present disclosure, various operations/processes according to the present disclosure may be implemented by software and/or firmware, and programs constituting the software may be installed, from storage media or networks, on a computer system having dedicated hardware structures, such as the computer system 90 shown in FIG. 9. The computer system with various programs installed can perform various functions, including those functions mentioned above. FIG. 9 shows a structure diagram of a computer system according to some embodiments of the present disclosure.

In FIG. 9, the central processing unit (CPU) 901 performs various processes based on programs stored in the read-only memory (ROM) 902 or programs loaded from the storage device 708 to the random access memory (RAM) 903. Data required for CPU 901 to perform various processes is also stored in RAM 903 as needed. The central processing unit is only an example and can also be other types of processors, such as the various processors mentioned above. The ROM 902, RAM 903, and storage section 908 may be various forms of computer readable storage media, as described below. It should be noted that although ROM 902, RAM 903, and storage device 908 are shown separately in FIG. 9, one or more of them may be combined or located in the same or different memory or storage modules.

The CPU 901, the ROM 902, and the RAM 903 are connected to each other via a bus 904. An input/output (I/O) interface 905 is also connected to the bus 904.

The following components are connected to the input/output interface 905: an input section 909, such as a touch screen, a touch pad, a keyboard, a mouse, an image sensor, a microphone, an accelerometer, a gyroscope, etc; an output section 907, including a display such as a cathode ray tube (CRT), liquid crystal display (LCD), a speaker, a vibrator, etc; a storage section 908, including a hard disk drive, a magnetic tape drive, etc; and a communication section 909 including a network interface card, such as a LAN card, a modem, etc. The communication section 909 allows communication to be performed over a network, such as the Internet. It is easy to understand that although the various devices or modules in the computer system 90 are shown in FIG. 9 communicating over the bus 904, they may also communicate over networks or other means, where the networks may include wireless networks, wired networks, and/or any combination of wireless and wired networks.

A drive 910 is also connected to input/output interface 905 as needed. A removable medium 911, such as a magnetic disk, an optical disk, a magneto-optical disk, a semiconductor memory, etc., is mounted on the drive 910 as needed so that computer programs read from the medium can be installed in the storage section 908 as needed.

In the case of implementing the above series of processes by software, the programs that make up the software may be installed from a network, such as the Internet, or from a storage medium, such as the removable media 911.

According to an embodiment of the present disclosure, the processes described above with reference to the flowchart can be implemented as a computer software program. For example, some embodiments of the present disclosure include a computer program product comprising a computer program carried on a computer-readable medium, the computer program containing program code for performing the method illustrated in the flowcharts. In such an embodiment, the computer program may be downloaded and installed from the network via the communication device 909, or installed from the storage device 908 or from the ROM 902. When the computer program is executed by a CPU 901, the above functions defined in the method provided by the embodiment of the present disclosure are performed.

It should be noted that, in the context of the present disclosure, a computer-readable medium may be a tangible medium, which may contain or store a program for use by or in connection with an instruction execution system, apparatus, or device. The computer readable medium may be a computer readable signal medium or a computer readable storage medium, or any combination of thereof. The computer readable storage medium may be, but is not limited to: an electronic, magnetic, optical, electromagnetic, infrared, or semiconductor system, apparatus, or device, or any combination of the above. More specific examples of the computer readable storage medium may include, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may include a data signal that is propagated in the baseband or as part of a carrier, carrying computer readable program code. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, including but not limited to wire, fiber optic cable, RF (radio frequency), etc., or any suitable combination of the foregoing.

The above computer readable medium may be included in the electronic device described above; or it may exist alone without being assembled into the electronic device.

In some embodiments, there is further provided a computer program, comprising: instructions that, when executed by a processor, cause the processor to perform the method of any one of the above embodiments. For example, the instructions can be embodied as computer program code.

In embodiments of the present disclosure, computer program code for executing operations of the present disclosure may be complied by any combination of one or more program design languages, the program design languages including, but not limited to, object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, including local area networks (LAN) or wide area networks (WAN), or connected to external computers (for example using an Internet service provider via the Internet).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the drawings. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The modules, components or units involved in the embodiments described in the present disclosure can be implemented by software or hardware. Wherein, the names of the modules, components or units do not constitute a limitation on the modules, components or units themselves under certain circumstances.

The functions described above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD), etc.

The above description only shows some embodiments of the present disclosure and illustrates technical principles applied in the present disclosure. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

Many specific details are elaborated in the description of the present disclosure. However, it is understood that embodiments of the present invention can be implemented without these specific details. In other cases, well-known methods, structures, and techniques are not described in detail so as not to obscure the understanding of the description.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although some specific embodiments of the present disclosure have been described in detail by way of example, those skilled in the art should understand that the above examples are only for the purpose of illustration and are not intended to limit the scope of the present disclosure. It should be understood by those skilled in the art that the above embodiments may be modified without departing from the scope and spirit of the present disclosure. The scope of the disclosure is defined by the following claims.

What is claimed is:

1. A conversation method, comprising:
displaying a first conversation between a first user and a second user on a client of the first user;
calling one or more robots for the first user based on information of the first conversation;
generating auxiliary conversation information of the one or more robots based on the first conversation; and
displaying the auxiliary conversation information, wherein the calling the one or more robots for the first user based on the information of the first conversation comprises:
determining a conversation scenario between the first user and the second user based on the information of the first conversation;
calling, in response to the conversation scenario being a first type, the one or more robots for participating in the conversation between the first user and the second user for the first user, and
calling, in response to the conversation scenario being a second type, the one or more robots for providing reference information for the first user.

2. The conversation method according to claim 1, wherein:
the auxiliary conversation information is information sent from the one or more robots during a process of participating in the conversation between the first user and the second user, or
the auxiliary conversation information is information provided to the first user for reference.

3. The conversation method according to claim 1, wherein the one or more robots corresponds to the first conversation, the information of the first conversation comprises semantic information of the first conversation, and the calling the one or more robots for the first user based on the information of the first conversation comprises:
determining the one or more robots corresponding to the first conversation based on the semantic information of the first conversation; and
calling the one or more robots corresponding to the first conversation for the first user.

4. The conversation method according to claim 3, further comprising:
taking a specified amount of last generated conversation message(s) in the first conversation as a target conversation, or taking conversation message(s) last generated within a specified time period in the first conversation as the target conversation, or taking conversation messages belonging to a same topic in the first conversation as the target conversation; and
determining the semantic information of the first conversation based on the target conversation.

5. The conversation method according to claim 3, further comprising:
determining topic(s) involved in one or more rounds of conversation in the first conversation; and determining, in response to a number of topic(s) involved in the one or more rounds of conversation not exceeding a specified value, summary information of the first conversation as the semantic information of the first conversation; or
extracting key information from the first conversation as the semantic information of the first conversation.

6. The conversation method according to claim 3, wherein the determining the one or more robots corresponding to the first conversation based on the semantic information of the first conversation comprises:
determining, in response to a number of topic(s) involved in the semantic information being greater than a specified value, or the semantic information of the first conversation is unclear, a conversation guide robot as a robot corresponding to the first conversation; and
matching, in response to the number of topic(s) involved in the semantic information not being greater than the specified value, the semantic information of the first conversation with attribute(s) of one or more candidate robots; and
determining the one or more robots corresponding to the first conversation based on a matching result.

7. The conversation method according to claim 1, wherein the calling the one or more robots for the first user comprises:
displaying a first calling control for a robot corresponding to the first conversation; and
triggering, in response to the first user performing a trigger operation on the first calling control, generation of the auxiliary conversation information.

8. The conversation method according to claim 7, wherein the calling control comprises instruction information to the robot corresponding to the first conversation, the instruction information being generated according to semantic information of the first conversation, and triggering the generation of the auxiliary conversation information comprises:
triggering, in response to a trigger operation of the first user on the first calling control, generation of the auxiliary conversation information based on the instruction information and the first conversation.

9. The conversation method according to claim 7, wherein the auxiliary conversation information comprises at least one of reference information associated with the first conversation, a summary of the first conversation, or a response to the second user.

10. The conversation method according to claim 1, further comprising:
displaying a second conversation message sent from the first user, wherein the second conversation message is determined based on the auxiliary conversation information, wherein the auxiliary conversation information is not visible to the second user.

11. The conversation method according to claim 1, wherein the displaying the auxiliary conversation information comprises:
displaying, on a conversation interface of the first user and the second user, the auxiliary conversation information, wherein the auxiliary conversation information is sent from a robot participating in the conversation between the first user and the second user.

12. The conversation method according to claim 1, wherein the generating the auxiliary conversation information of the one or more robots based on the first conversation comprises:

generating, in response to the first conversation corresponding to a service intent, the auxiliary conversation information, wherein the auxiliary conversation information comprises at least one of a product card or a service subscription card.

13. The conversation method according to claim 1, further comprising:

displaying, in response to a calling operation of the first user on a robot, a robot determined based on the information of the first conversation or a robot specified by the operation; or displaying a second calling control corresponding to a candidate robot, and displaying, in response to a trigger operation on the second calling control, a response of the candidate robot to the first conversation.

14. An electronic device, comprising:

at least one memory; and at least one processor coupled to the at least one memory, the at least one processor configured to, based on instructions stored in the at least one memory, carry out the conversation method of claim 1.

15. A non-transitory computer-readable storage medium with a computer program stored thereon that, when executed by at least one processor, implements the conversation method of claim 1.

16. A conversation method, comprising:

displaying a first conversation between a first user and a second user on a client of the first user;

calling one or more robots for the first user based on information of the first conversation;

generating auxiliary conversation information of the one or more robots based on the first conversation; and displaying the auxiliary conversation information;

the information of the first conversation comprises a category of the second user, and the calling the one or more robots for the first user based on the information of the first conversation comprises:

calling, in response to the category of the second user being a specified category, a conversation guide robot for participating in a subsequent conversation between the first user and the second user for the first user.

17. The conversation method according to claim 16, wherein the auxiliary conversation information is a message sent from the conversation guide robot during a process of participating in the subsequent conversation, and the generating the auxiliary conversation information of the one or more robots comprises:

generating association information of semantic information of both the first conversation and the subsequent conversation based on the semantic information of both the first conversation and the subsequent conversation, and information of the first user and information of the second user; and generating a message sent from the conversation guide robot based on the association information.

18. An electronic device, comprising:

at least one memory; and at least one processor coupled to the at least one memory, the at least one processor configured to, based on instructions stored in the at least one memory, carry out the conversation method of claim 16.

19. A conversation method, comprising:

displaying a first conversation between a first user and a second user on a client of the first user;

calling one or more robots for the first user based on information of the first conversation;

generating auxiliary conversation information of the one or more robots based on the first conversation; and displaying the auxiliary conversation information;

the information of the first conversation comprises a sending time of conversation, and the calling the one or more robots for the first user based on the information of the first conversation comprises:

calling, in response to a last conversation message in the first conversation being sent from the second user and an interval between a sending time of the last conversation message and a current time being greater than a specified threshold, a robot serving as a virtual avatar of the first user to reply to the second user.

20. The conversation method according to claim 19, wherein a profile photo of the virtual avatar robot is generated based on an image specified by the first user, and a voice of the virtual avatar robot is generated based on a voice specified by the first user.

\* \* \* \* \*